(12) United States Patent
Flack

(10) Patent No.: US 6,577,296 B2
(45) Date of Patent: Jun. 10, 2003

(54) FIXED CURSOR

(75) Inventor: James F. Flack, Los Altos Hills, CA (US)

(73) Assignee: Vega Vista, Inc., Mountain View, CA (US)

( * ) Notice: Subject to any disclaimer, the term of this patent is extended or adjusted under 35 U.S.C. 154(b) by 0 days.

(21) Appl. No.: 09/847,086

(22) Filed: May 1, 2001

(65) Prior Publication Data

US 2002/0057256 A1 May 16, 2002

Related U.S. Application Data

(60) Provisional application No. 60/248,935, filed on Nov. 14, 2000.

(51) Int. Cl.$^7$ .................................................. G09G 5/08
(52) U.S. Cl. ........................ 345/158; 345/856; 345/858; 345/157
(58) Field of Search .............................. 345/158, 856, 345/857, 858, 859, 860, 862, 156, 157, 169, 864, 684, 682, 685, 688

(56) References Cited

U.S. PATENT DOCUMENTS

| | | | | |
|---|---|---|---|---|
| 4,734,689 A | * | 3/1988 | Kurakake | ..................... 345/684 |
| 5,333,247 A | * | 7/1994 | Gest et al. | ..................... 345/672 |
| 5,526,481 A | * | 6/1996 | Parks et al. | ..................... 345/163 |
| 5,581,670 A | | 12/1996 | Bier et al. | ..................... 395/326 |
| 5,602,566 A | * | 2/1997 | Motosyuku et al. | ......... 345/156 |
| 5,617,114 A | | 4/1997 | Bier et al. | ..................... 345/113 |
| 5,666,449 A | | 9/1997 | Baudel et al. | ............... 345/347 |
| 5,686,940 A | * | 11/1997 | Kuga | ..................... 345/156 |
| 5,689,667 A | | 11/1997 | Kurtenbach | ................. 395/352 |
| 5,790,769 A | | 8/1998 | Buxton et al. | ............... 395/173 |
| 5,926,178 A | | 7/1999 | Kurtenbach | ................. 345/352 |
| 5,973,669 A | | 10/1999 | Fitzmaurice et al. | ........ 345/157 |
| 6,005,482 A | | 12/1999 | Moran et al. | ............ 340/568.8 |
| 6,115,025 A | | 9/2000 | Buxton et al. | ............... 345/126 |
| 6,115,028 A | | 9/2000 | Balakrishnan et al. | ...... 345/157 |
| 6,118,427 A | | 9/2000 | Buxton et al. | ............... 345/113 |
| 6,124,843 A | * | 9/2000 | Kodama | ..................... 345/157 |
| 6,128,007 A | * | 10/2000 | Seybold | ..................... 345/174 |
| 6,148,271 A | | 11/2000 | Marinelli | ..................... 702/141 |
| 6,151,563 A | | 11/2000 | Marinelli | ..................... 702/141 |

* cited by examiner

Primary Examiner—Kent Chang
(74) Attorney, Agent, or Firm—Perkins Coie LLP

(57) ABSTRACT

A cursor which is fixed at a point in a display screen, where navigational controls move the contents of display screen rather than the cursor. Preferably the cursor is used in conjunction with hand held displays.

4 Claims, 6 Drawing Sheets

FIXED CURSOR

This application claims priority, under 35 U.S.C. §119 (e), of U.S. provisional application No. 60/248,935, entitled "Fixed Cursor," filed Nov. 14, 2000 which is incorporated herein by reference. This application is also filed contemporaneously with application, "Cursor Navigation System and Method for a Display," which is incorporated herein by reference.

BACKGROUND

As computer display systems increase in complexity the need to keep the interface simple and user friendly becomes more essential. A great advancement in this area has been the creation of a cursor control, so that a cursor may be moved freely around a display screen and point to individual segments of displayed contents. A user of a computer can move the cursor to a segment of interest on the display and effect certain computer instructions to act on that segment specifically. A common example of the use of the cursor is to enable the user to point to a specific item in a list or a specific icon, which represents a file, folder, program or other computer data. Then the user can effect a sequence of computer instructions through some input means, such as a "mouse click," that causes the file, folder, program or other computer component to be "opened" and/or activated.

Other advancements have been made that can give a user a greater ability to move some or all of the contents of a display screen around the display. This capability is especially useful when the format of the information contents is larger (longer, wider or both) than the display can show at one time. At first this capability was limited to either scrolling vertically or horizontally, but newer programs have been developed to allow the free movement of the contents in any direction. Examples of this type of display screen can be found, for example, in U.S. patent application Ser. No. 09/328,053, filed Jun. 8th, 1999, which is incorporated herein by reference. In this application, a hand held device displays a portion of a computer image, and a user scrolls this image by moving the hand held device in real space. However, navigating a cursor at the same time as scrolling in real space can become burdensome to the user.

As greater advancements in the movement of display screen contents are made, the burden on the user to manage the controls also increases. What is needed is a novel simplification of the way display screen contents are navigated.

SUMMARY OF THE INVENTION

The present invention seeks to improve the user interface with a display screen for computer systems that have maneuverable contents such as pan and scroll functions and/or unconstrained movement of the contents. One objective of the invention is to simplify the number of controls that a user must manipulate to find specific items of interest within information contents on display, and then to select the specific items with a cursor to effect further computer action.

In a preferred embodiment, the fixed cursor has a toggle function, which stops the cursor from being fixed. In yet another preferred embodiment, the fixed cursor is used in conjunction with a hand-held display device. In a combination of preferred embodiments, movement controls that scroll the contents of the hand-held display switch to moving the cursor when the toggle function is activated. Most preferably, motion commands move the contents of the display in the hand held display device, allowing the hand-held display to be operated with only one hand.

In another preferred embodiment, contents of a display will not scroll past the axes of the cursor, thereby keeping some portion of the content visible on the display at all times. Preferably the axes of the cursor are not show on the display.

DETAILED DESCRIPTION OF THE DRAWINGS

The present invention seeks to improve the user interface with a display screen for computer systems that have maneuverable contents such as pan and scroll functions and/or unconstrained movement of the contents. One objective of the invention is to simplify the number of controls that a user must manipulate to find specific items of interest within information contents and then to select the specific items with a cursor to effect further computer action. Information contents, in this case, refers to the portion or portions of a virtual content that a user interprets to have some meaning, such as a picture or text.

Simplifying the number of controls on a computer is especially important for computer information contents that are larger than can be presented on the computer display at one time. One basis of the present invention is the fact that, if the content information can be moved around the computer's display screen, especially to bring into view on the screen some portion of information content the total of which is larger than the screen, then the same content movement controls can further be used to position any given segment of interest within the information content to any desired location on the display device. Thus, one could both move the information content around the screen to bring segments of interest into view and then one could further adjust the information contents to position a specific segment to coincide with a particular location on the display screen. A specific location on the display screen can be designated as the selection, pointer or "cursor" location and any specific contents moved to the selection location would be designated as selectable for further computer action effected by a computer command such as a "mouse click".

Figure 1:
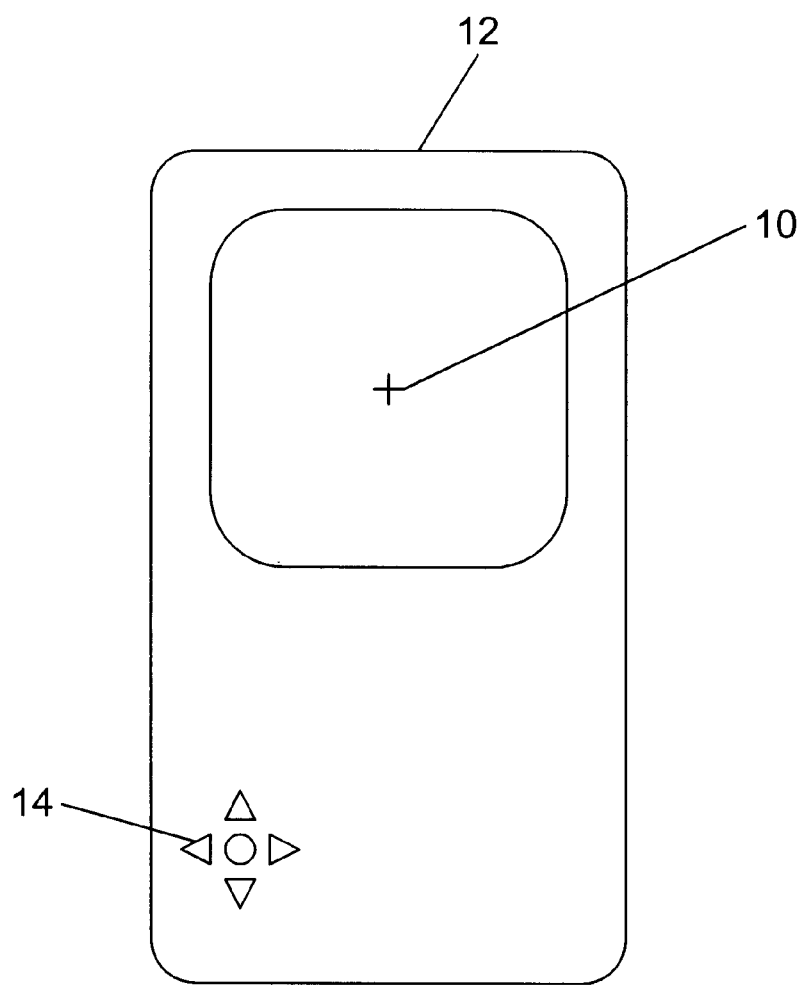
FIG. 1 depicts the fixed cursor in the center of a display screen of a hand held electronics device.

In FIG. 1, the fixed cursor 10 is in a type of hand-held display 12. The display 12 need not be hand held, but, as will be discussed later on, the most preferred embodiment of this invention is in combining the fixed cursor with a hand-held display. In this embodiment of the present invention, the center of a display screen is designated to be the selection, pointer or "cursor" location. Commands, such as a "mouse click" that effect computer action on contents at the cursor location do so at that center point. Preferably, motion commands 14 move the contents of the screen, rather than the cursor. The motion commands shown in FIG. 1 and the following figures 14 are stylized for the sake of simplicity. The movement commands can be of almost limitless variety.

Figure 2:
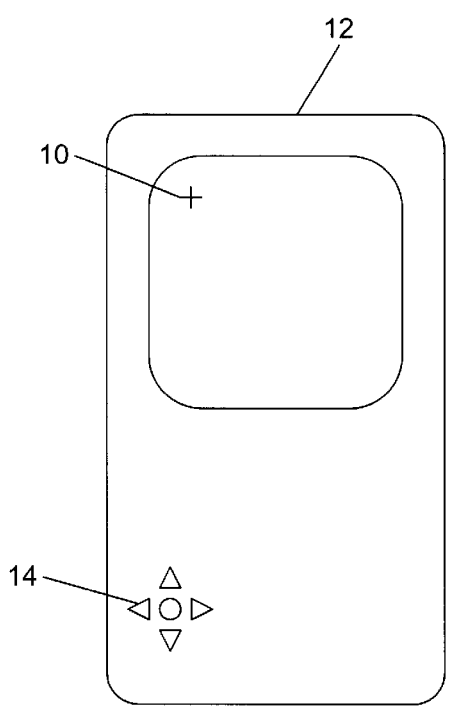
FIGS. 2 and 3 shows a similar device as in FIG. 1 but with the cursor fix in an off center position.
Figure 3:
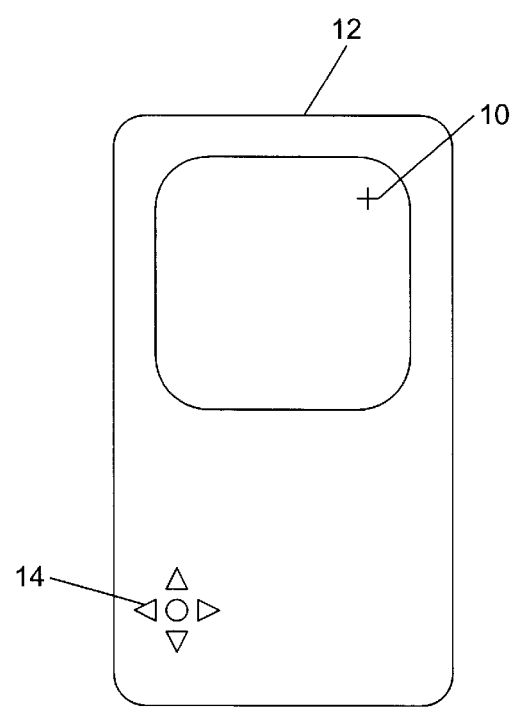
Figure 4:
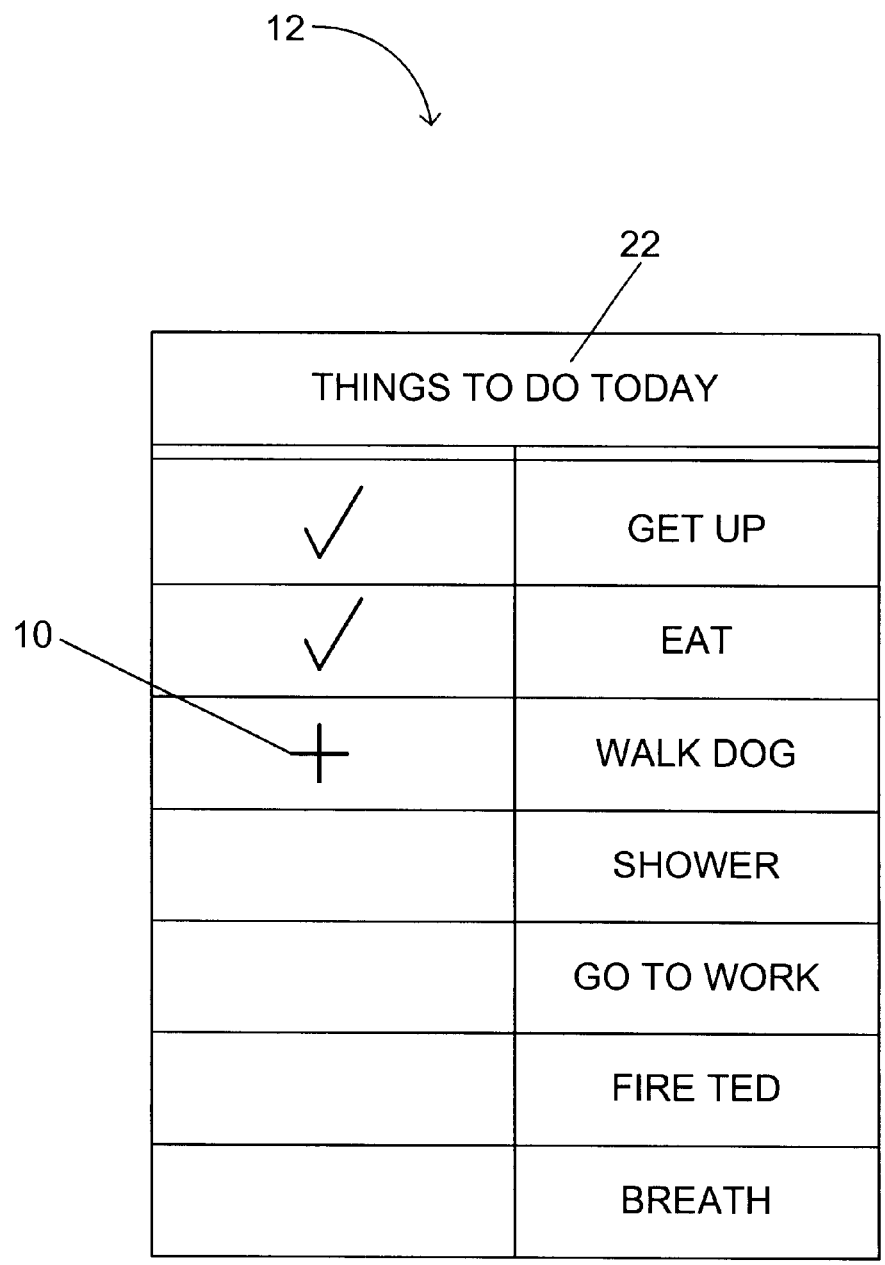
FIG. 4 illustrates an example of how an off-center fixed cursor may be used with a specific program.

In FIGS. 2 and 3 the point at which the cursor 10 is placed is off-center, in relation to the perimeter of the display screen 12. In a refined embodiment, a user designates the point at which they wish the cursor to be fixed on the display screen, which may be a place other than the center. The user may designate the desired point for the fixed cursor location by selections made to the user's "profile" or a "preferences" file stored in the computer. Also, the user may select the location when opening a file to be examined. It can be envisioned that certain types of information content may be of a style or format that is better suited to having the fixed cursor in a location other than the center. One example, shown in FIG. 4, is a checklist having two columns 22, the first column being a box to check and the second column being the corresponding name or description of the item in the checklist. In this example, one could imagine a preferred location of the fixed cursor to be on the left side of the screen 10 and, in this example, centered vertically. Thus, the list can be easily perused by moving the contents up and down and the check box would naturally align with the location of the fixed cursor on the left side. This configuration would be quite suitable for perusing a list of items and selectively marking the check box with a "mouse click" as the check box of the items to be selected passes underneath the fixed cursor.

In one aspect of the invention there is a toggle function. A toggle function alternates the movement controls from moving the contents under a fixed cursor, to moving the cursor over fixed contents. In this embodiment, the user may scroll the content until they reach a desired location, toggle the fixed cursor function, and then move the cursor over the displayed contents. With the addition of the toggle function, a system designed under this embodiment still only has need of one set of movement controls. Toggling back to a fixed cursor can, interchangeably, reset the cursor to its original fixed location, or halt it where it is.

This toggle function is particularly useful when combining the present invention with smaller, hand-held devices. Smaller devices, by their very design, have a limited amount of space in which can be dedicated to controls of any kind, little enough multiple sets of movement controls. Toggling between a fixed cursor and a fixed background allows for a reduced number of movement controls, and also can free up display space by being able to do away with scrolls bars and the like.

A particularly useful combination of inventions is envisioned when the current invention is combined with hand-held displays that navigate by real-space hand motion. One example of this kind of hand-held display can be found in U.S. patent application Ser. No. 09/328,053, filed Jun. 8th, 1999, which is incorporated herein by reference. In that application, a hand-held PDF uses accelerometers to navigate a display. A user holds the PDF, then, as they move their hand, the accelerometer tracks their hand movement and correspondingly scrolls the contents of the display. In this manner a user may scroll the contents of a display using only the hand that is holding the PDF, and without using any movement controls on the exterior of the PDF. The fixed cursor, with or without the toggle function, fits well into this technology. With the cursor being fixed, the user may operate the PDF competently with one hand. Being able to freeze the contents and switching movement controls from the scrolling of contents to the moving of the cursor adds a great deal of control and freedom of use, while at the same time still letting the user operate the device with only one hand. In this union of technology, a third toggle mode, halting the scrolling of the contents while still keeping the cursor fixed, can also be added.

In yet another embodiment of the current invention, the fixed cursor only becomes fixed when a particular type of program is opened on a computer system. This can be seen as an automatic version of the toggle discussed above.

Figure 5:
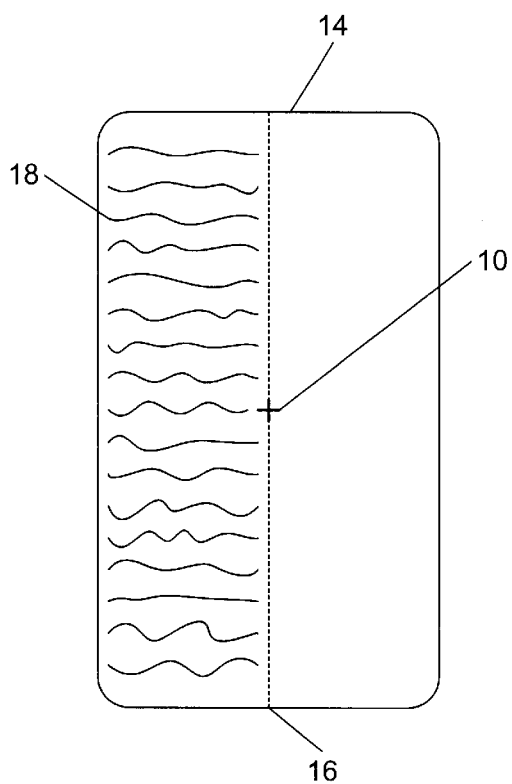
FIG. 5 and FIG. 6 show one embodiment of the current invention where the scrolling of the contents of the display screen are bound by the position of the fixed cursor.
Figure 6:
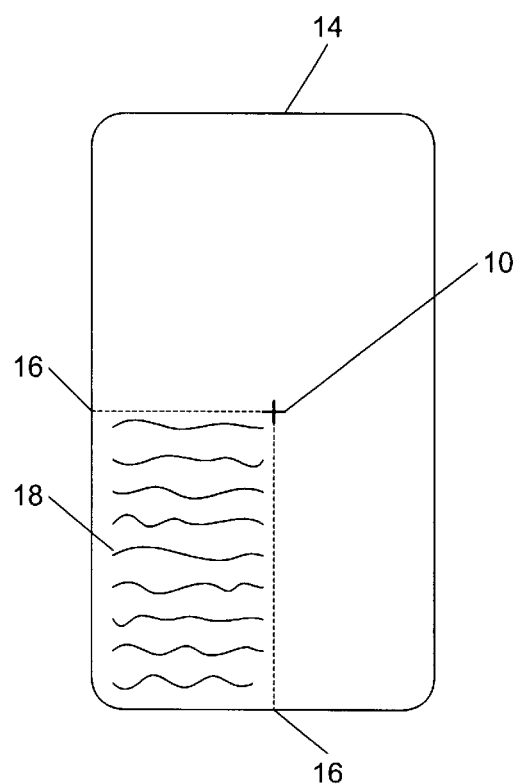

FIGS. 5 and 6 show a further embodiment of the present invention, where the fixed point of the cursor acts as a boundary to the scrolling limitations of the display device. The fixed cursor 10, as a part of some sort of display 14, does not allow the contents of the display 18, to move past the axes of the fixed cursor 16. In this feature, the displayed contents may only be scrolled as far as the fixed cursor point; in this way some portion of the contents are always visible on the display device. One of the user interface problems encountered when panning or scrolling information content on a display device is that it may be possible to pan and/or scroll the information until it is completely off the screen. If this occurs, the problem exist that the user can no longer see any of the content and so the user does not have a reference as to which direction to pan and/or scroll controls in order to bring the information containing contents back into view. The fixed cursor using this embodiment may also serves as a marker on the display screen that defines the maximum limit of the pan and scroll functions. Thus, when pan and/or scroll functions are activated, the contents can be moved accordingly, up to the limit marked by the fixed cursor and the user has an unambiguous indication visible on the display screen as to which direction to pan and/or scroll the contents to move to any other portion of the information contents.

Often, virtual images or documents have some form of special reset or re-center command that is used to re-establish the information to a certain location on the screen. Incorporating this into the fixed cursor, the fixed cursor gains the ability to have any portion of the information contents positioned to correspond with its fixed location. In other words, a certain spot on the contents, which can be referred to as a "hot spot," is linked to the position of the fixed cursor, so that when this function is activated, the contents automatically shifts until the "hot spot" is located directly beneath the fixed cursor. Thus, any portion of the information contents can be reached by the cursor for selection or other action that may be effected by a command function, such as a "mouse click."

Figure 7:
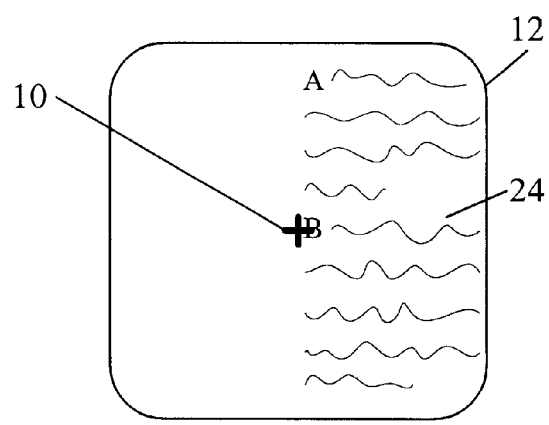
FIGS. 7 through 9 demonstrate one method of selecting text from a document according to one embodiment of the current invention.
Figure 8:
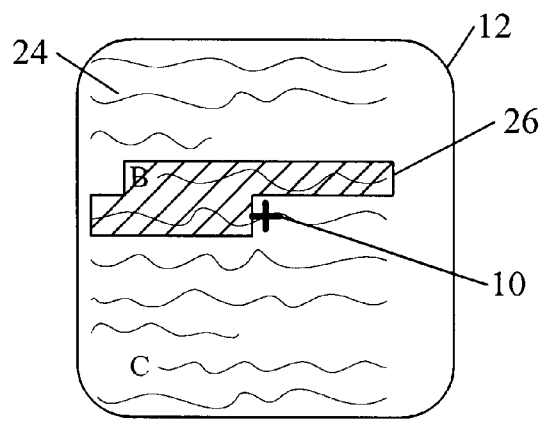
Figure 9:
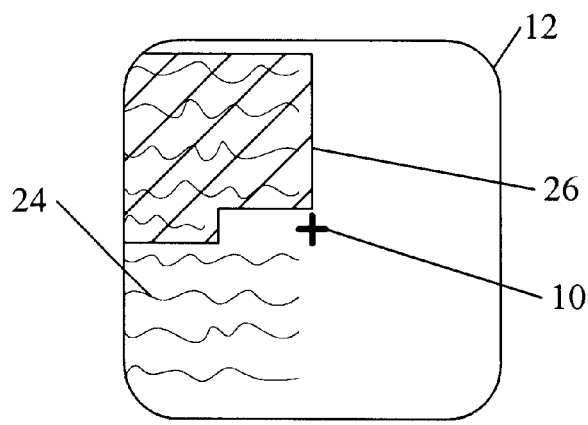

FIGS. 7 through 9 show one method of how the cursor according to one embodiment of the invention can be used to perform standard word processing functions such as selection of text. A portion of the text 24 is chosen by scrolling the text until the cursor 10 is over the place where selection is to begin. FIG. 8 shows the mid-way part of the selection, were the cursor 10 appears to move over the desired text 26 by scrolling the content upwards and to the left, until, as shown in FIG. 9, the entire desired text 26 is selected. It is worth mentioning again here that having the scrolling of the contents bound by the axes of the cursor make the selection of text much more simple. Other ways of selection text or other display features using the current invention would be equally apparent to one of ordinary skill in the art.

Figure 10:
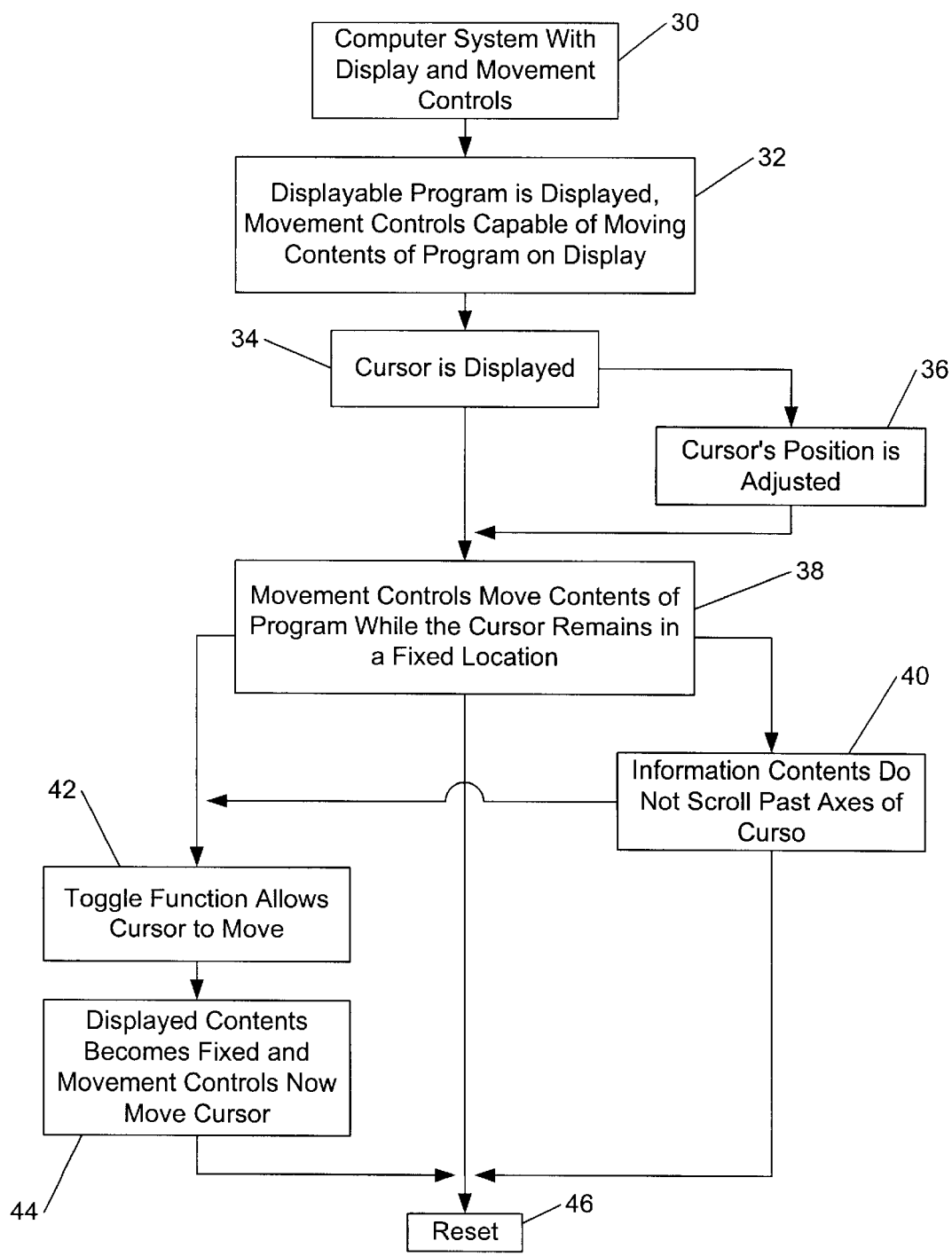
FIG. 10 is a flow chart summarizing many aspects of the current invention.

FIG. 10 summarizes many aspects of the current invention discussed above. A fixed cursor, inherently, works with some type of computer system 30. The computer system has to have a display of some kind, as well as movement controls. Movement controls may come in a large variety of forms. Keyboards, a mouse, lasers and accelerometers are just a few example of types of movement controls. In the next step of FIG. 10, 32 a program capable of being displayed on the computer system is so displayed. After the program is displayed 32 a cursor is also displayed 34. It is important to note that steps 32 and 34 can be interchangeable. Preferably, though, the program is displayed before the cursor as the program might itself have some requirements or suggestions as to where the cursor should be fixed. Alternately, the position of the cursor may be adjusted 36. This adjustment usually would occur prior to navigation of the programmable contents, but adjustment of the cursor 36 can be done at almost any stage. When the movement controls actually move the contents 38, which preferably would resemble scrolling but might be another type of movement, the cursor remains fixed in the location it was first displayed in or adjusted to. Conceivably, a user may operate at this step almost indefinitely. Not showing in this diagram is the ability of a user to display a second, third or greater number of programs without have to re-display the cursor.

FIG. 10 also shows various preferred embodiments discussed above. These preferred embodiments will tend to be performed after step 38, but this need not be the case. The preferred embodiments in FIG. 10 are having the scrolling of the information contents limited by the axes of the cursor 40, toggling cursor 42 and contents movement 44, and resetting various aspects of the system 46. Limiting the scrolling of the information contents by the axis of the cursor has a two fold effect. One is that, since the cursor is fixed, it is desirable not to have the important parts of the contents scroll past where they can be activated on by the cursor. This also make the selection of sections of text easier, as shown in FIGS. 7 through 9. The other effect of limiting the scrolling of the information contents is so a user will always have some indication of what portion of the contents they are looking at and in which direction to scroll in order view other desired sections. Toggling the fixed nature of the cursor 42 is another preferred embodiment which may be combined with the scrolling limitations. Toggling the fixed nature of the cursor is helpful in any number of situations, and may even be used to re-set the cursor to a new fixed location. In a preferred embodiment, when the cursor is toggled so that it may move again, the contents of the display screen become fixed and the same movement controls that moved the contents now move the cursor. Of course, this does not have to be the case. The cursor can have its own set of controls, and the contents does not have to stop when the cursor controls are activated. The reset function 46 applies to any number of potential resets. It can reset the cursor to its original fixed location, reset a particular part of the contents under the cursor, reset the toggle, or even the displayable program. The reset 46 of FIG. 10 is meant to express all the reset abilities discussed in this application as well as those common in the art.

What is claimed is:

1. A cursor for use in a computer system with a display screen and a set of controls which move the contents within the display screen, wherein the cursor is in a fixed location relative to the perimeter of the display screen and wherein the contents of the display screen will not move further than the axes of the cursor.

2. The cursor as recited in claim 1, wherein said device is a hand-held device has motion sensors and the set of controls is based on the motion sensors.

3. A device for use in displaying data on a hand-held electronic device display screen comprising:
    controls for moving said data relative to said display screen;
    wherein said controls include detectors of translational motion of said hand-held electronic device;
    cursor visible on said display screen;
    a toggle capable of being activated by a user wherein said cursor remains stationary relative to said display screen when said toggle is activated; and wherein a boundary for the movement of data is determined by the axes of said cursor, wherein data outside of said boundary is not displayable on said display without deactivating said toggle.

4. A system for controlling contents on a display of a hand-held electronic device, wherein the position of a cursor located on said display is controlled by a set of one or more motion sensors which respond to the translational motion of said hand-held device, wherein a toggle can be activated by a user to fix said cursor in position on said display and wherein when said toggle is activated said contents on a display are controlled by said translational motion, wherein said contents include more data than can be displayed on a single screen of said display; and herein said display can display only any portion of said contents which is located inside the axes of said cursor in a fixed position when said toggle is activated.

* * * * *